United States Patent

Shiomi et al.

[15] 3,705,740

[45] Dec. 12, 1972

[54] COLLISION FORCE ABSORPTION DEVICE

[72] Inventors: Masanao Shiomi, Toyota-shi; Tadataka Narumi, Kariya-shi, both of Japan

[73] Assignee: Toyota Jidosha Kogyo Kabushiki Kaisha, Aichi-ken, Japan

[22] Filed: Dec. 12, 1969

[21] Appl. No.: 884,675

[30] Foreign Application Priority Data

Dec. 17, 1968 Japan ......................43/92763

[52] U.S. Cl.......................293/89, 293/52 F, 188/1 C

[51] Int. Cl. ............................F16f 7/12, B60r 19/06

[58] Field of Search.......188/1 C; 213/1 A; 293/52 F, 293/85, 89

[56] References Cited

UNITED STATES PATENTS

| | | | |
|---|---|---|---|
| 2,161,820 | 6/1939 | Kessenich | 244/138 |
| 3,444,962 | 5/1969 | Lech | 188/1 |
| 2,161,820 | 6/1939 | Kessenich | 244/138 |
| 3,097,725 | 7/1963 | Peterson | 188/94 |

FOREIGN PATENTS OR APPLICATIONS

| | | | |
|---|---|---|---|
| 131,450 | 8/1919 | Great Britain | 188/1 C |

*Primary Examiner*—Gerald M. Forlenza
*Assistant Examiner*—Robert Saifer
*Attorney*—Berman, Davidson & Berman

[57] ABSTRACT

An energy absorbing member in the shape of a coil having a plurality of closely spaced loops, being capable of plastic deformation in one direction only, and being rigid in the opposite direction, said energy member being fixed at one end through a force receiving member to a vehicle accessory, such as a bumper, or a seat, and being fixed at the other end through a support member to the vehicle chassis.

1 Claim, 2 Drawing Figures

X
2
15
6
4
7
5
13
8
9
16
10
3
1

PATENTED DEC 12 1972 3,705,740

INVENTORS.
MASANAO SHIOMI,
TADATAKA NARUMI,

BY Berman, Davidson & Berman,
ATTORNEYS.

COLLISION FORCE ABSORPTION DEVICE

BACKGROUND OF THE INVENTION

The present invention relates to an energy absorbing device which may be incorporated in the bumper assembly, seat assembly, or like portion of a vehicle to absorb the energy of a collision and protect the vehicle, the operator, or passengers from the collision force imparted from the exterior of the vehicle. With the recent increase in speed and number of automobiles, it has become socially important to safeguard the cars and their occupants against frequent injury from rear end collisions which impart whiplash to the occupants.

The present invention is intended to overcome this problem by providing an energy absorbing device, or devices, in combination with the bumper, the seat, or other parts of the vehicles so as to absorb the external collision force effectively to avoid injury to the occupants of the vehicles. Destruction of the vehicle parts is also avoided. The invention is further intended to provide a device which, after such collision, can be removed from the vehicle and replaced by a new energy absorbing member when the member is deformed beyond repair, or may be replaced by the same member when the deformation can be corrected and the energy absorbing member restored to its original condition.

SUMMARY

The device according to the invention comprises a receiving member for receiving external forces, a supporting member for supporting the receiving member movably, and an energy absorbing member having its ends respectively fixed to said receiving and supporting members. The energy absorbing member is formed of resilient material having high resistance to plastic deformation and is made of metal strip, or bar coiled with loops in contiguous, abutting, or nearly abutting relation, whereby the absorbing member will not yield, or plastically deform in one direction, but will yield and deform when subjected to a force in the opposite direction, spreading apart the said coils.

A principal object of the invention is to provide an energy absorbing member secured at its ends to a relatively displaceable force receiving member and a fixed supporting member, such that a predetermined external force applied to the receiving member first displaces said member relative to the supporting member, and this displacement is converted to a force which plastically deforms and elongates the energy absorbing member to open the spaces between a plurality of closely spaced, or abutting coils, forming the energy absorbing member.

Another important object of the invention is to provide an energy absorbing member which comprises a metal strip having a number of coils, said member acting to spread the coils, only upon receiving an external force in the direction of elongation and preventing such spreading upon receipt of an external force in the opposite direction tending to compress the member.

Yet another object of the invention is to provide an energy absorbing member, having the above described characteristics, which is of simple construction, easy and economical to produce, and easy to repair for reuse, or to replace by another and similar absorbing member.

A still further object of the invention is to provide an energy absorbing device, having the above described characteristics, which, after absorbtion of energy from an external force, can be replaced simply by again plastically deforming the deformed portion of the device to assume its original shape for repeated operations.

BRIEF EXPLANATION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

PREFERRED EMBODIMENTS

Figure 1:
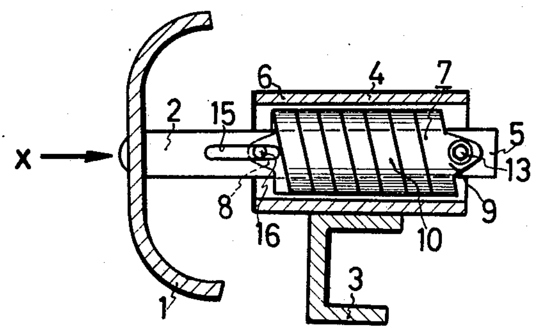
FIG. 1 is a central cross-sectional view of an energy absorbing device according to the invention incorporated in a vehicle bumper assembly.
Figure 2:
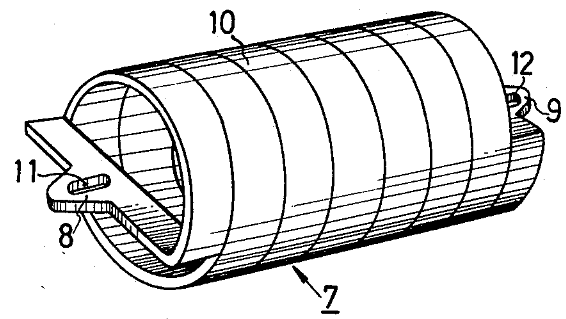
FIG. 2 is a perspective view of the energy absorbing member used in FIG. 1.

Referring now more particularly to the drawings, FIGS. 1 and 2 illustrate a preferred form of the collision device according to the invention incorporated in a bumper assembly of a vehicle. To the rear of bumper 1 is secured a bumper stay 2, or bar, herein termed a receiving member for receiving an external force applied to the bumper in the direction of the arrow X. A tube 4, or supporting member, is welded to a reinforcing channel 3 forming part of the chassis of a vehicle, not shown. An energy absorbing member 7 shaped as a coil spring provided with end, or bearing portions 8 and 9, is positioned in tube 4. Bearing portion 8 is slidably mounted to bumper stay 2 by means of a bolt 16 riding in the longitudinal slot 15 in an intermediate portion of the stay and disposed adjacent the forward end 6 of tube 4. The free near end 5 of the bumper stay 2 is fixedly secured to bearing portion 9 of member 7 by the bolt 13.

The energy absorbing member 7 is formed of a strip, or bar, of resilient material having high resistance to plastic deformation, for example, of a mild steel strip, coiled spirally to form closely spaced loops, preferably having abutting edges, lying in a cylindrical surface at the mid-portion 10 of the member. The free ends, or bearing portions 8 and 9 of the strip are diametrically disposed at the ends of the coil and are respectively provided with a bolt slot 11 and bolt hole 12 extending through projecting lugs aligned in the coil axis. The force receiving member 2 extends along the central axis of the cylindrical portion 10 of the energy absorbing member 7. Through a bolt hole formed on the rear end 5 of the stay 2, and the bolt hole 12 of the bearing portion 9, is passed the bolt 13 for firmly securing the stay 2 and the member 7 together. Thus secured to each other, the stay 2 with the member 7 is inserted freely into the interior of the tube 4. Bolt 16 is then inserted through a pair of bolt holes diametrically provided in the forward end 6 of the tube 4, the bolt slot 11 in the bearing portion 8 of the energy absorbing member 7, and the elongated axial slot 15 in the bumper stay 2 so that the energy absorbing member 7 is fixedly supported on the forward end 6 of the tube 4, but is free to elongate rearwardly. The slot 15 guides axial movements of stay 2 and member 7, while slot 11 allows some play before member 7 begins to deform.

In operation, whenever the bumper 1 of the vehicle collides with an object, or obstacle, the energy of shock then produced in the direction of the arrow X displaces the bumper stay 2 axially of the tube 4 as the supporting member of said stay. If the energy of shock is larger than the predetermined force which will plastically deform the energy absorbing member 7, the latter will be elongated so as to lengthen the distance between the bearing portions 8 and 9, and the mid-portion 10 is elongated and plastically deformed to spread apart the central loops, or coils. This deformation is continued until the energy of deformation equals the energy of the shock and as a result the shock energy is absorbed. The axial displacement of the bumper stay 2 is not mechanically obstructed because of the presence of the elongated slot 15 at the connection point to the tube 4. Energy absorption will not occur when the shock force on the bumper is in the opposite direction since the coils of the mid-portion 10 of the energy absorbing member 7 preferably contact each other, having little or no space therebetween.

It will be apparent, from the above description of the preferred embodiments, that the invention provides an energy absorbing member having a mid-portion in the form of a resilient strip highly resistant to plastic deformation and bent into coils which are preferably in abutting relation, so that plastic deformation in the direction of compression of the energy absorbing member is not possible, but plastic deformation is effected to absorb tensile shock forces exerted in the opposite direction.

The energy absorbing member can be easily produced in large quantities because of the simplicity of its form and is most useful in those instances in which the shock force is relatively small because the energy absorbing member has an initial relatively small resistance against deformation because of having the mid portion bent into coils. It will be understood that the described initial resistance against deformation can desirably be pre-selected by a suitable choice of the thickness, width, and material of the strip from which the energy absorbing member is shaped. While this description has been limited to a showing of one shock absorber device in the assembly, obviously a plurality, or as many as required may be used to support the associated vehicle part and to absorb any reasonable collision force.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

The energy absorbing member of the present invention is applied to the bumper in the above-mentioned embodiment, but the same absorbing member is available to the seat in such a manner as being fixed between the adjustable frame of the seat mounted on the body of the vehicle and the seat base frame movably provided on said adjustable frame.

What we claim is:

1. An energy absorbing device comprising a supporting member for connection to a vehicle chassis, a receiving member for connection to a vehicle bumper for transmission of an external force, and being displaceable with respect to said supporting member, and an energy absorbing member having end portions respectively fixed to said receiving and supporting members, said energy absorber being formed of a strip of material having high resistance to plastic deformation and having the shape of a coil with a plurality of closely spaced loops in its mid-portion to provide a plurality of closely spaced surface angularly disposed with respect to said end portions, said receiving member comprising a bar for securement at its front end to a vehicle bumper, said bar passing through said energy absorbing member axially of the coil and being affixed at its rear end to the rear end of the coil, said supporting member being a tube for securement to a chassis frame element and being disposed coaxially with and surrounding said coil, the forward end of said coil being affixed to the forward end of said tube by fastening means passing through a longitudinal slot in an intermediate portion of the receiving member, whereby a shock force applied to the receiving member will plastically deform the energy absorbing member so as to widen the spaces between said closely spaced surfaces of the mid-portion.

* * * * *